US008968897B2

(12) United States Patent
Baek et al.

(10) Patent No.: US 8,968,897 B2
(45) Date of Patent: Mar. 3, 2015

(54) SECONDARY BATTERY

(75) Inventors: Ho-Yul Baek, Yongin-si (KR); Jae-Rok Kim, Yongin-si (KR); Jong-Man Kim, Yongin-si (KR); Jake Kim, Yongin-si (KR); Kyeong-Beom Cheong, Yongin-si (KR)

(73) Assignee: Samsung SDI Co., Ltd., Giheung-gu, Yongin-si, Gyeonggi-do (KR)

( * ) Notice: Subject to any disclaimer, the term of this patent is extended or adjusted under 35 U.S.C. 154(b) by 421 days.

(21) Appl. No.: 13/539,976

(22) Filed: Jul. 2, 2012

(65) Prior Publication Data

US 2013/0136959 A1 May 30, 2013

(30) Foreign Application Priority Data

Nov. 24, 2011 (KR) ........................ 10-2011-0123660

(51) Int. Cl.
*H01M 2/12* (2006.01)
(52) U.S. Cl.
USPC .............................................. 429/54; 429/53
(58) Field of Classification Search
CPC ... H01M 2/1223; H01M 2/1229; H01M 2/12; H01M 2/1276; H01M 2/1205; H01M 2/1211
USPC ..................................... 429/53, 54
See application file for complete search history.

(56) References Cited

U.S. PATENT DOCUMENTS

| 8,597,808 B2 * | 12/2013 | Park et al. ........................ 429/53 |
| 2005/0277017 A1 | 12/2005 | Cho |
| 2008/0166625 A1 | 7/2008 | Schembri et al. |
| 2010/0081039 A1 | 4/2010 | Nakahama et al. |
| 2011/0052947 A1 | 3/2011 | Joswig et al. |

FOREIGN PATENT DOCUMENTS

| JP | 11-096988 | 4/1999 |
| JP | 2005-332824 A | 12/2005 |
| JP | 2008-533658 A | 8/2008 |
| JP | 2010-86798 A | 4/2010 |
| KR | 1020010045556 A | 6/2001 |
| KR | 1020070103890 A | 10/2007 |
| KR | 1020090124110 A | 12/2009 |

* cited by examiner

*Primary Examiner* — Ula C. Ruddock
*Assistant Examiner* — Thomas H. Parsons
(74) *Attorney, Agent, or Firm* — Robert E. Bushnell, Esq.

(57) ABSTRACT

A secondary battery includes a battery unit that has an accommodation space for an electrode assembly, a vent housing that defines a housing space connected with the accommodation space through a first vent hole, the vent housing including a second vent hole through which the housing space is connected with an outside of the secondary battery, a revolving member that is rotatably mounted between a closing position for closing the first and second vent holes and an opening position for opening the first and second vent holes, and first and second sealing caps that are formed at opposite sides of the revolving member with respect to a rotation axis of the revolving member. The first and second sealing caps respectively close the first and second vent holes, when the revolving member is mounted at the closing position.

19 Claims, 5 Drawing Sheets

SECONDARY BATTERY

CLAIM OF PRIORITY

This application makes reference to, incorporates the same herein, and claims all benefits accruing under 35 U.S.C. §119 from an application earlier filed in the Korean Intellectual Property Office on the 24 Nov. 2011 and there duly assigned Serial No. 10-2011-0123660.

BACKGROUND OF THE INVENTION

1. Field of the Invention

One or more embodiments of the present invention relate to secondary batteries.

2. Description of the Related Art

Due to reaction with an active material and an electrolyte, gases, such as $CO_2$ or $H_2$, are generated in a secondary battery. When these gases are formed in a space inside the secondary battery, the active material in certain portions of the secondary battery may undesirably lose its function or movement of lithium ions in an electrolyte may be hindered, resulting in reduction of the lifespan of the secondary battery. Moreover, if the generated gas accumulates, an internal pressure of the secondary battery may increase, which may lead to an explosion of the secondary battery.

Thus, to improve the lifespan and stability of the secondary battery, the generated gas needs to be discharged to the outside of the secondary battery to prevent loss of the function of the active material and to remove bubbles formed in the electrolyte.

SUMMARY OF THE INVENTION

One or more embodiments of the present invention include an improved secondary battery.

One or more embodiments of the present invention include secondary batteries from which a gas accumulated therein may be easily discharged.

One or more embodiments of the present invention include a secondary battery from which a gas accumulated therein may be discharged and also an inflow of external harmful materials may be blocked.

Additional aspects will be set forth in part in the description which follows and, in part, will be apparent from the description, or may be learned by practice of the presented embodiments.

According to one or more embodiments of the present invention, a secondary battery includes a battery unit that has an accommodation space for an electrode assembly, a vent housing that defines a housing space connected with the accommodation space through a first vent hole, the vent housing including a second vent hole through which the housing space is connected with an outside of the secondary battery, a revolving member that is rotatably mounted between a closing position for closing the first and second vent holes and an opening position for opening the first and second vent holes, and first and second sealing caps that are formed at opposite sides of the revolving member with respect to a rotation axis of the revolving member. The first and second sealing caps respectively close the first and second vent holes when the revolving member is mounted at the closing position.

The revolving member may be disposed in the housing space.

The revolving member may rotate in a first rotational direction to reach the closing position where the first and second vent holes are both closed, and may rotate in a second and opposite rotational direction to reach the opening position where the first and second vent holes are both opened.

The revolving member may include first and second arms that extend in opposite directions with respect to the rotation axis. The first and second sealing caps are formed at end portions of the first and second arms, respectively.

A weight of the first arm may bias the revolving member to the closing position, and a weight of the second arm may bias the revolving member to the opening position. The first arm extends longer than the second arm.

The secondary battery may further include an elastic body that biases the revolving member to the closing position.

The elastic body may be a rotational spring having a first end and a second end connected to the revolving member and the rotation axis, respectively.

First and second filter members may be formed at open ends of the first and second vent holes, respectively.

The first and second filter members may have selective transmittivity to allow transmission of a gas and to prevent transmission of a fluid.

The first and second sealing caps may protrude from the revolving member toward the first and second vent holes, respectively.

A cross-section of each one of the first and second sealing caps may gradually decrease in size toward the corresponding one of the first and second vent holes as the first and second sealing caps respectively protrude into the first and second vent holes.

The first and second sealing caps may be formed to have a cone shape having sharp front tips toward the first and second vent holes, respectively.

Surfaces of the first and second sealing caps contacting wall portions of the first and second vent holes may be formed with elastic layers.

The vent housing may be disposed on a cap plate that defines the accommodation space.

The first vent hole may be formed in the cap plate.

A pair of electrode terminals that have opposite polarities and are respectively electrically connected to a positive electrode plate and a negative electrode plate of the electrode assembly may protrude from the cap plate.

Accordingly, a gas accumulated inside the second battery may be easily discharged outside, and an inflow of external harmful materials may be prevented.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, in which like reference symbols indicate the same or similar components, wherein.

DETAILED DESCRIPTION OF THE INVENTION

Figure 1:
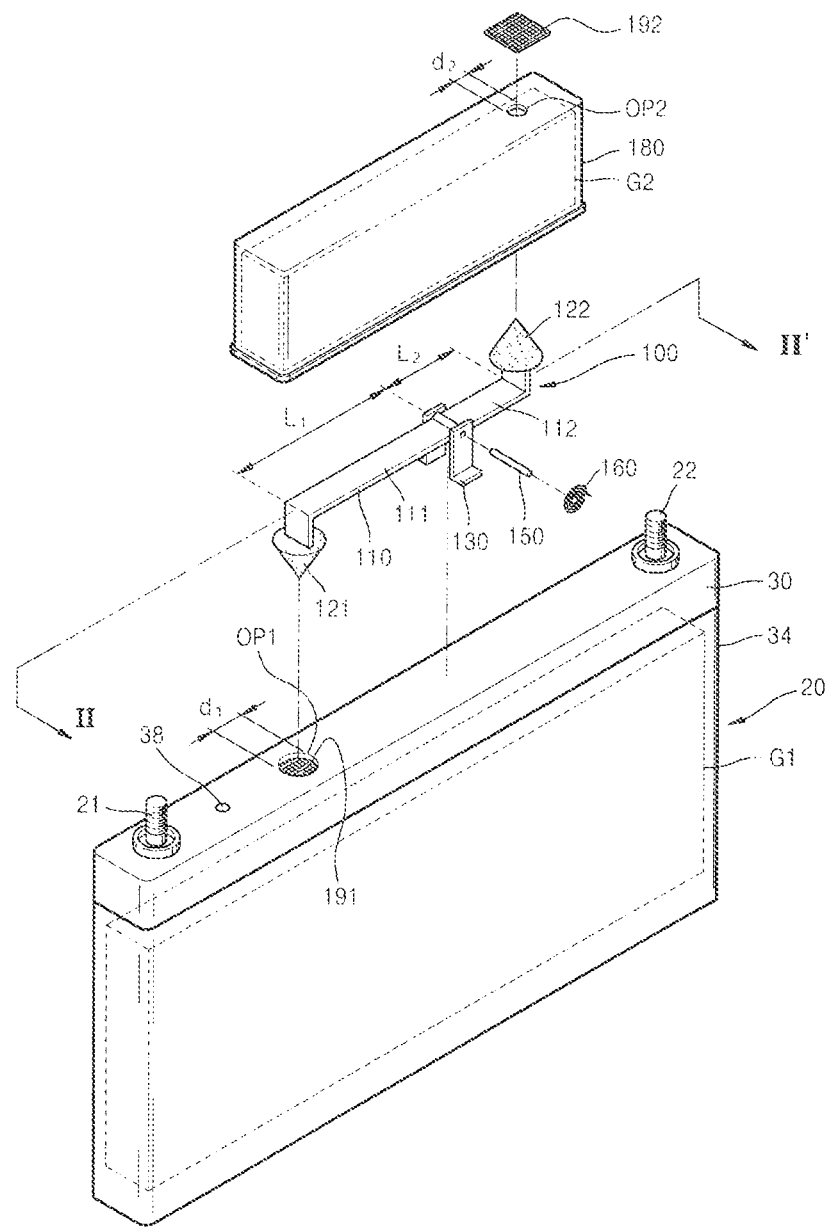
FIG. 1 is a disassembled oblique view of a secondary battery constructed as an embodiment according to the principles of the present invention.

For medium-sized or large-sized batteries, in order to obtain stability and to prevent the costs of exchanging batteries, gas is removed without destroying the batteries. However, according to the related art, a breaking portion is inserted so that a portion of a case is broken with an increase of internal pressure, and this makes it difficult to reuse a secondary battery and the stability of the secondary battery is not secured due to the breaking.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

Figure 2:
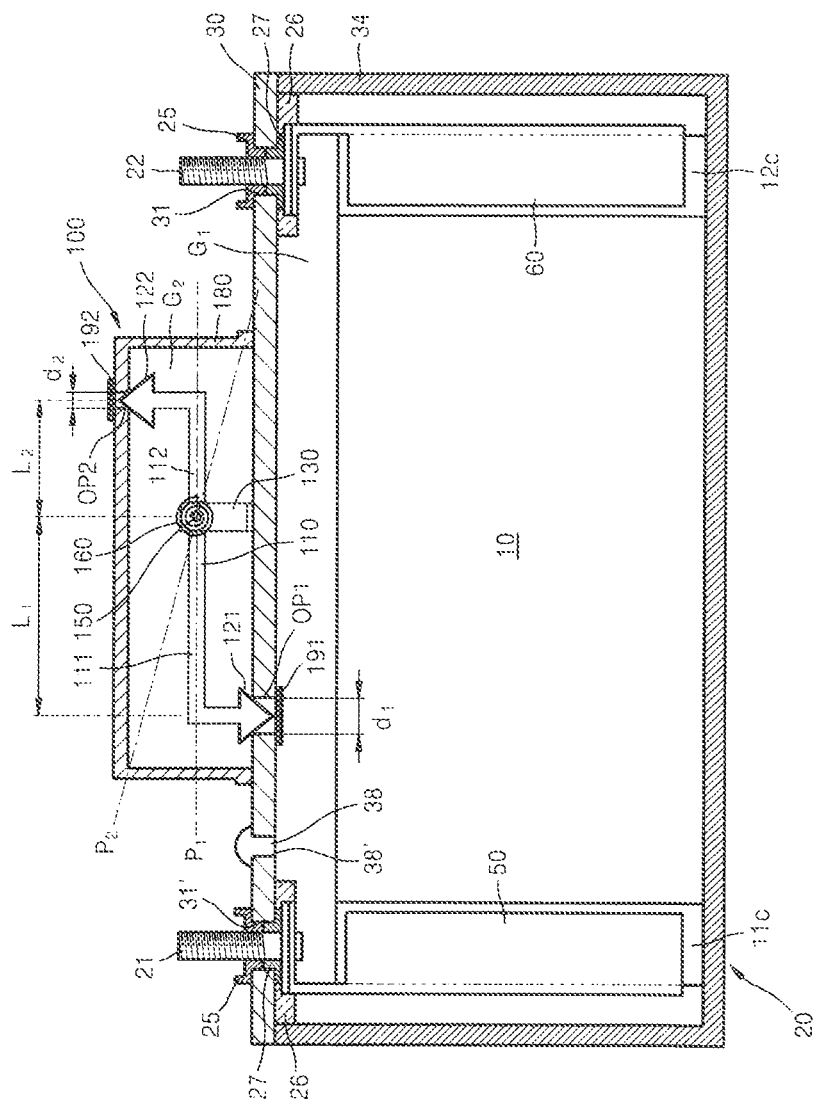
FIG. 2 is a cross-sectional view of the secondary battery cut along a line II-II' of FIG. 1.
Figure 3:
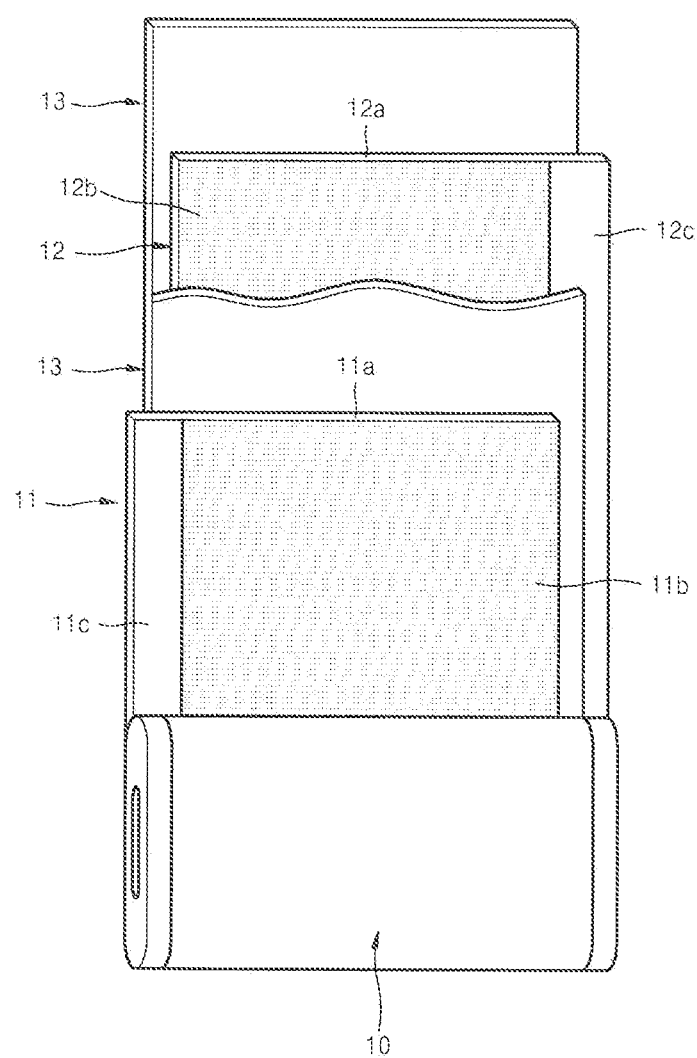
FIG. 3 is a schematic view of an electrode assembly of FIG. 2, constructed as an embodiment according to the principles of the present invention.

FIG. 1 is a disassembled perspective view of a secondary battery constructed as an embodiment according to the principles of the present invention. FIG. 2 is a cross-sectional view of the secondary battery cut along a line of II-II' FIG. 1. FIG. 3 is a schematic view of an electrode assembly 10 of FIG. 2.

Referring to FIGS. 1 and 2, the secondary battery constructed as the embodiment according to the principles of the present invention includes a battery unit 20 and a gas discharge unit 100 that discharges a gas accumulated in the battery unit 20 to the outside of the secondary battery.

In detail, the secondary battery includes the battery unit 20 that has an accommodation space $G_1$ for an electrode assembly, a vent housing 180 that defines a housing space $G_2$ that is connected with the accommodation space $G_1$ via a first vent hole OP1 and in which a second vent hole OP2 is formed to connect the housing space $G_2$ and outside, and a revolving member 110 that is rotatably mounted between a closing position $P_1$ and an opening position $P_2$ of the first and second vent holes OP1 and OP2. The revolving member 110 and the vent housing 180 form the gas discharge unit 100.

The first and second vent holes OP1 and OP2 and the revolving member 110 operate to close or open the first and second vent holes OP1 and OP2 to discharge a gas that accumulates in the accommodation space $G_1$ as an internal pressure of the accommodation space $G_1$ increases, so as to prevent accidents, such as explosion or rupture of the secondary battery.

In detail, the first and second vent holes OP1 and OP2 provide a discharge path of the gas accumulated in the accommodation space $G_1$. For example, the first vent hole OP1 may be formed in a cap plate 30 that defines the accommodation space $G_1$. The first vent hole OP1 connects the accommodation space $G_1$ and the housing space $G_2$, providing a discharge path for discharging the gas from the accommodation space $G_1$ to the housing space $G_2$.

The gas that has flowed into the housing space $G_2$ after passing through the first vent hole OP1 is discharged to the outside of the secondary battery through the second vent hole OP2. The second vent hole OP2 connects the housing space $G_2$ and the outside of the secondary battery and may be formed in the vent housing 180 that defines the housing space $G_2$.

Sizes and shapes of the first and second vent holes OP1 and OP2 may differ. For example, the first and second vent holes OP1 and OP2 may be circular, wherein a diameter d1 of the first vent hole OP1 may be designed larger than a diameter d2 of the second vent hole OP2 (d1 of the first vent hole OP1>d2 of the second vent hole OP2). Accordingly, the first vent hole OP1 connected to the accommodation space $G_1$ is formed relatively large so that a gas accumulated inside the accommodation space $G_1$ is quickly discharged, whereas the second vent hole OP2 connected to the outside is formed relatively small so as to block the inflow of external harmful materials. The first and second vent holes OP1 and OP2 are not limited to the circular form described above and may also have other forms, such as a rectangular form.

The vent housing 180 may be formed to have a hollow cover shape, one surface of which is opened. For example, the vent housing 180 may have a rectangular parallelepiped shape of which a bottom surface is opened as illustrated in FIG. 1. However, the current embodiment of the present invention is not limited thereto, and the vent housing 180 may also have other various forms. For example, the vent housing 180 may have a closed cube form in which the first and second vent holes OP1 and OP2 are formed.

The vent housing 180 may be mounted on the cap plate 30 to define the housing space $G_2$ thereon. For example, the housing space $G_2$ may be defined as a space between the cap plate 30 and the vent housing 180. The housing space $G_2$ forms a discharge path of a gas between the first and second vent holes OP1 and OP2.

The first and second vent holes OP1 and OP2 are simultaneously opened or closed according to rotation of the revolving member 110. The revolving member 110 may be disposed inside the vent housing 180 and may be rotatably fixed on the cap plate 30 via a rotation axis 150 and a support 130.

Figure 4:
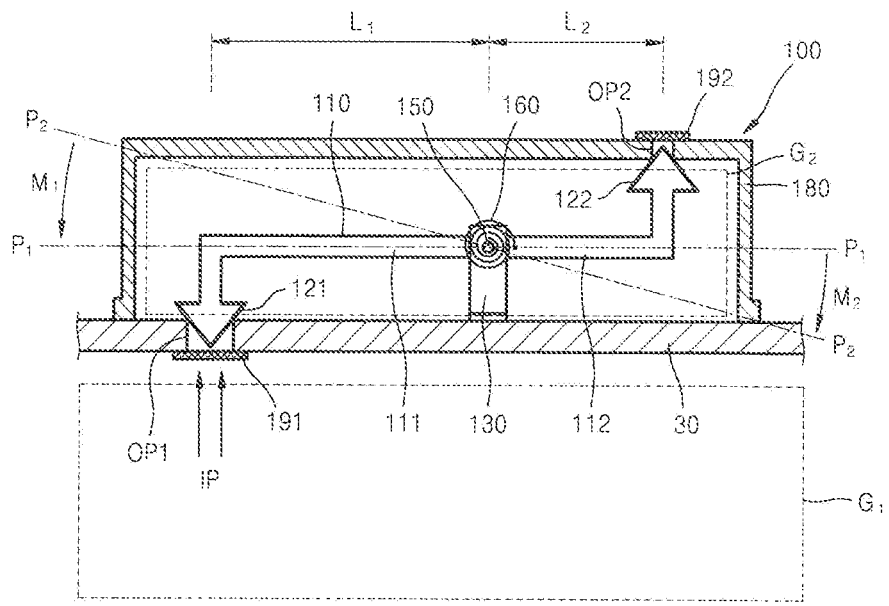
FIGS. 4 and 5 respectively illustrate a revolving member at a closing position and an open position, as an embodiment according to the principles of the present invention.
Figure 5:
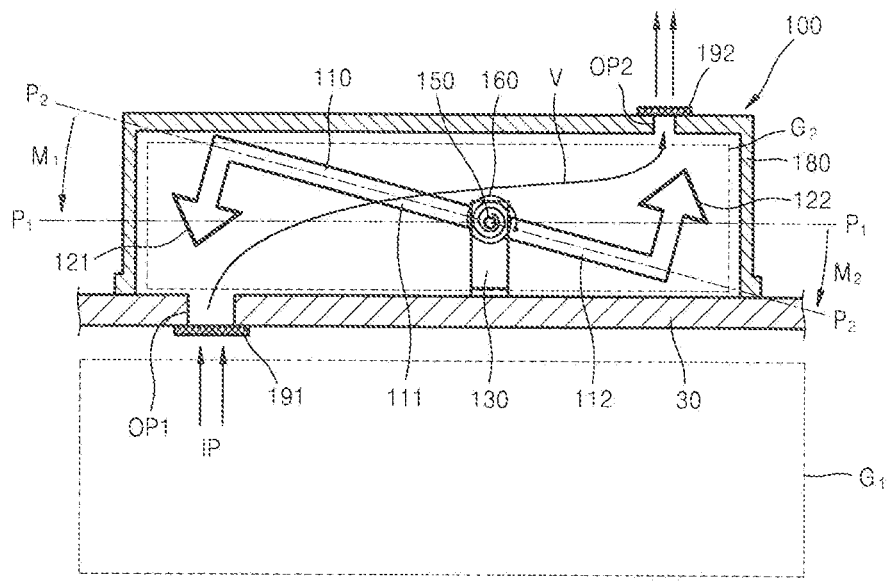

FIGS. 4 and 5 illustrate the revolving member 110 at a closing position $P_1$ and an opening position $P_2$, as an embodiment according to the principles of the present invention. Rotation of the revolving member 110 between the closing position $P_1$ and the opening position $P_2$ to open and close the first and second vent holes OP1 and OP2 is described with reference to FIGS. 4 and 5.

The revolving member 110 is rotatably mounted between the closing position $P_1$ and the opening position $P_2$ of the first and second vent holes OP1 and OP2. When the revolving member rotates in a first rotation direction M1 with respect to the rotation axis 150 to arrive at the closing position $P_1$, the first and second vent holes OP1 and OP2 are both closed. When the revolving member rotates in an opposite, second rotation direction M2 to arrive at the opening position $P_2$, the first and second vent holes OP1 and OP2 are both opened.

The revolving member 110 may be fixed to the cap plate 30 via the rotation axis 150 and the support 130, and the vent housing 180 may be mounted on the cap plate 30 so as to accommodate the revolving member 110.

The revolving member 110 is rotated to the closing position $P_1$ or the opening position $P_2$ depending on physical force acting on the revolving member 110. For example, if an internal pressure IP of the accommodation space $G_1$ increases, the increased internal pressure IP rotates a first sealing cap 121 of the revolving member 110 to the opening position $P_2$. Accordingly, because the revolving member 110 is at an opening position, the first and second vent holes OP1 and OP2 are also opened. The opened first and second vent holes OP1 and OP2 provide a discharge path V for a gas accumulated in the accommodation space $G_1$.

However, when the internal pressure IP decreases as the gas accumulated in the accommodation space $G_1$ is discharged, the revolving member 110 at the opening position $P_2$ rotates to the closing position $P_1$ according to a bias force toward the closing position P1 (first rotation direction M1), and the first and second vent holes OP1 and OP2 are also both closed.

The bias three toward the closing position $P_1$ (first rotation direction M1) may be in various form. As will be described below, the bias force may be gravity or elastic force due to an imbalance of weights of first and second arms 111 and 112 of the revolving member 110, an imbalance of weights of first and second sealing caps 121 and 122, or the elastic body 160 mounted on the revolving member 110.

The revolving member 110 may be a rod member that extends substantially straight. However, two end portions of the revolving member 110 may be curved toward the first and second vent holes OP1 and OP2, so that, as will be described below, the first and second scaling caps 121 and 122 are closely adhered to wall portions of the first and second vent holes OP1 and OP2.

The revolving member 110 has the first and second arms 111 and 112 that extend in opposite directions with respect to the rotation axis 150. The first arm 111 and the second arm 112 may be designed to have different lengths. That is, the first arm 111 may be formed longer than the second arm 112 (length $L_1$ of the first arm 111>length $L_2$ of the second arm 112).

For example, a weight of the first arm 111 generates a rotational moment that rotates the revolving member 110 to the closing position $P_1$ (first rotation direction M1), and a weight of the second arm 112 generates a rotational moment that rotates the revolving member 110 to the opening position $P_2$ (direction M2). As the first arm 111 is relatively longer, the revolving member 110 may be biased to the closing position $P_1$.

For example, the revolving member 110 at the opening position $P_2$ due to the increased internal pressure IP of the accommodation space $G_1$ may return to the closing position $P_1$ according to a bias force towards the closing position $P_1$ (first rotation direction M1) after gas is discharged. In addition, the revolving member 110 that is biased to the closing position $P_1$ is prevented from arbitrarily rotating to the opening position $P_2$ by external vibration or impact, and penetration of external materials such as harmful materials like water through the opened first and second vent holes OP1 and OP2 is prevented.

According to another embodiment of the present invention, irrespective of the lengths L1 and L2 of the first and second arms 111 and 112, the revolving member 110 may be biased to the closing position $P_1$ through imbalance of the weights of the first and second arms 111 and 112 or the total weights of the first and second sealing caps 121 and 122 formed at end portions of the first and second arms 111 and 112. For example, the first and second arms 111 and 112 and/or the first and second sealing caps 121 and 122 may be formed of different materials to create weight imbalance.

The elastic body 160 that biases the revolving member 110 to the closing position P1 may be connected to the revolving member 110. For example, a rotational spring may be installed between the revolving member 110 and the rotation axis 150 as the elastic body 160, and a first end of the rotational spring may be connected to the revolving member 110 and a second end of the rotational spring may be connected to the rotation axis 150.

For example, the revolving member 110 at the opening position $P_2$ due to the increased internal pressure IP of the accommodation space $G_1$ may return to the closing position P1 according to a bias force towards the closing position $P_1$ (first rotation direction M1) after gas is discharged. In addition, the revolving member 110 that is biased to the closing position $P_1$ is prevented, from arbitrarily rotating to the opening position $P_2$ by external vibration or impact, and penetration of external harmful materials through the opened first and second vent holes OP1 and OP2 is prevented.

The first and second sealing caps 121 and 122 that close or open the first and second vent holes OP1 and OP2 are formed at the two end portions of the revolving member 110. At the closing position P1 of the revolving member 110, the first and second sealing caps 121 and 122 close the first and second vent holes OP1 and OP2, respectively.

The first and second sealing caps 121 and 122 may be formed at end portions of the first and second arms 111 and 112 of the revolving member 110 to protrude from the end portions of the first and second arms 111 and 112 toward the first and second vent holes OP1 and OP2.

Figure 6A:
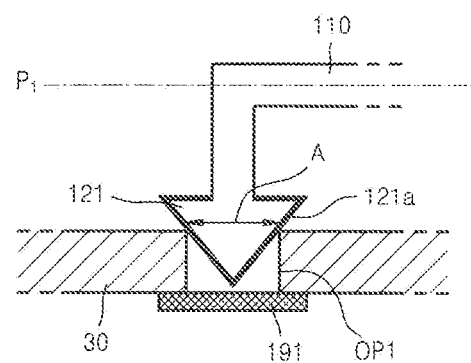
FIGS. 6A and 6B respectively illustrate first and second sealing caps constructed as an embodiment according to the principles of the present invention.
Figure 6B:
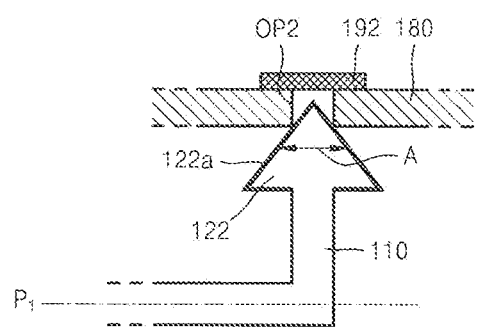

FIGS. 6A and 6B illustrate the first and second sealing caps 121 and 122 constructed as embodiments according to the principles of the present invention, respectively.

The first and second sealing caps 121 and 122 may be formed to have a cross-section that is sufficient to closely seal the first and second vent holes OP1 and OP2. The cross-section A of each one of the first and second sealing caps 121 and 122 may have a shape that decreases in size as the first and second sealing caps 121 and 122 protrude into the first and second vent holes OP1 and OP2. For example, the first and second sealing caps 121 and 122 may have the smallest cross-section A at a position adjacent to the first and second vent holes OP1 and OP2.

Thus, by forming the first and second sealing caps 121 and 122 to have the variable cross-section A, when the revolving member 110 at the opening position $P_2$ rotates to the closing position $P_1$, the first and second sealing caps 121 and 122 at the two end portions of the revolving member 110 may closely contact the wall portions of the first and second vent holes OP1 and OP2 to maintain a stable sealing state.

For example, the first and second sealing caps 121 and 122 may have a conic shape having a sharp front tip toward the first and second vent holes OP1 and OP2. The front tips of the first and second sealing caps 121 and 122 may be inserted into the first and second vent holes OP1 and OP2 in a depth direction of the first and second vent holes OP1 and OP2.

The first and second sealing caps 121 and 122 may be formed to have a shape to correspond to the first and second vent holes OP1 and OP2, respectively. For example, when the first and second vent holes OP1 and OP2 are formed to have a circular form, the first and second sealing caps 121 and 122 may be formed to have a cone shape. However, the embodiment of the present invention is not limited thereto; for example, when the first and second vent holes OP1 and OP2 are formed to have a rectangular form, the first and second sealing caps 121 and 122 may be formed to have a quadrangular pyramid shape.

Surfaces of the first and second sealing caps 121 and 122 contacting the wall portions of the first and second vent holes OP1 and OP2 may be formed with elastic layers 121a and 122a. That is, because the elastic layers 121a and 122a are formed on the surfaces of the first and second sealing caps 121 and 122, respectively, the first and second sealing caps 121 and 122 and the wail portions of the first and second vent holes OP1 and OP2 may be in a close contact, respectively, and thus, sealing characteristics therebetween may be improved.

For example, the surfaces of the first and second sealing caps 121 and 122 may be entirely formed with elastic layers or may be selectively and partially formed with the elastic layers 121a and 122a. For example, the elastic layers 121a and 122a may be formed as rubber-based coating layers.

Referring to FIGS. 4 and 5, the accommodation space G1 of the electrode assembly 10 is not directly connected to the outside of the secondary battery via a vent structure, but indirectly through the first and second vent holes OP1 and OP2 and the housing space $G_2$. Consequently, sealing characteristics of the accommodation space $G_1$ may be improved and penetration of harmful materials from the outside may be blocked.

For example, at the closing position P1 of the revolving member 110, the first and second sealing caps 121 and 122 may seal the accommodation space $G_1$ of the electrode assembly so as to form a double sealing structure collectively. Also, the accommodation space G1 is not directly exposed to the outside at the opening position $P_2$ of the revolving member 110 so that penetration of external materials may be delayed or prevented.

At open ends of the first and second vent holes OP1 and OP2, first and second filter members 191 and 192 may be formed in order to block external harmful materials. For example, the first and second filter members 191 and 192 may be formed at open ends of the first and second vent holes OP1 and OP2 opposite to the housing space $G_2$ of the first and second vent holes OP1 and OP2. The first and second sealing caps 121 and 122 may be inserted into open ends of the first and second vent holes OP1 and OP2 adjacent to the housing space $G_2$ and thus physical interference with the first and second filter members 191 and 192 may be prevented in the above-described configuration.

The first and second filter members 191 and 192 may have selective transmittivity such that penetration of a gas component is allowed but transmission of a fluid component is blocked. Thus, when the revolving member 110 is at the opening position $P_2$, a gas passing through the first and second filter members 191 and 192 may be discharged but an inflow of external harmful materials such as a fluid component like water may be prevented. For example, the first and second filter members 191 and 192 may be formed of Gore-Tex® fabric. The Gore-Tex® fabric is a porous form of polytetrafluoroethylene with a micro-structure characterized by nodes interconnected by fibrils.

Hereinafter, a configuration of the battery unit 20 is described with reference to FIGS. 2 and 3.

The battery unit 20 includes the electrode assembly 10, a case 34 that accommodates the electrode assembly 10, and the cap plate 30 attached to the case 34. For example, the electrode assembly 10 may be set through an open upper end of the case 34 and the upper end of the case 34 is covered by the cap plate 30. The cap plate 30 and the case 34 may form the accommodation space G1 in which the electrode assembly 10 is accommodated.

Referring to FIG. 3, the electrode assembly 10 may include a positive electrode plate 11, a negative electrode plate 12, and a separator 13, and may be formed by winding a stack structure of the positive electrode plate 11 and the negative electrode plate 12 insulated from each other by the separator 13 therebetween in a jelly-roll shape. The positive electrode plate 11 may include a positive electrode collector member 11a and a positive electrode active material layer 11b formed on at least one surface of the positive electrode collector member 11a, and a positive electrode non-coated portion 11c where the positive electrode active material layer 11b is not formed on an edge of the positive electrode collector member 11a in a width direction.

The negative electrode plate 12 may include a negative electrode collector member 12a and a negative electrode active material layer 12b formed on at least one surface of the negative electrode collector member 12a, and a negative electrode non-coated portion 12c where the negative electrode active material layer 12b is not formed on an edge of the negative electrode collector member 12a in a width direction. For example, the positive electrode non-coated portion 11c and the negative electrode non-coated portion 12c may be formed on opposite edges of the electrode assembly 10 in a width direction.

Unlike in FIG. 3, the electrode assembly 10 may have a structure in which the positive electrode plate 11, the negative electrode plate 12, and the separator 13, which are sheet types, are stacked on one another.

As illustrated in FIG. 2, collector members 50 and 60 are electrically connected to the electrode assembly 10. The collector members 50 and 60 electrically connect the electrode assembly 10 to positive and negative electrode terminals 21 and 22, respectively. For example, the collector members 50 and 60 may be attached to both edges of the electrode assembly 10 by welding. The collector members 50 and 60 may include a positive electrode collector member 11a attached to the positive electrode non-coated portion 11c and a negative electrode collector member 12a attached to the negative electrode non-coated portion 12c.

The electrode terminals 21 and 22 that are electrically connected to the electrode assembly 10 may be formed to protrude from the cap plate 30. In detail, a pair of electrode terminals 21 and 22 of different polarities are electrically connected to the positive and negative electrode plates 11 and 12 of the electrode assembly 10, respectively. That is, a positive electrode terminal 21 is connected to the positive electrode plate 11 and a negative electrode terminal 22 is connected to the negative electrode plate 12. The positive and negative electrode terminals 21 and 22 may be inserted into terminal holes 31' of the cap plate 30, respectively, to be assembled.

The positive and negative electrode terminals 21 and 22 may be assembled each with upper and lower gaskets 25 and 27 around the positive and negative electrode terminals 21 and 22 to insulate the positive and negative electrode terminals 21 and 22 from the cap plate 30. For example, the upper and lower gaskets 25 and 27 may be inserted into the terminal holes 31' from above and below the cap plate 30, respectively. In addition to the upper and lower gaskets 25 and 27, an insulating sealing material 26 may be further formed to insulate the positive and negative electrode terminals 21 and 22 from the cap plate 30 or the positive and negative electrode terminals 21 and 22 from the case 34.

An electrolyte inlet hole 38' for injecting an electrolyte (not shown) into the case 34 may be formed in the cap plate 30. After injection of an electrolyte, the electrolyte inlet hole 38" may be sealed by a sealing member 38.

According to the embodiment of FIGS. 1 and 2, the gas discharging unit 100, including the revolving member 110 and the vent housing 180, may be disposed on the cap plate 30. However, the embodiment of the present invention is not limited thereto, and the gas discharging unit 100 may also be formed on the case 34 that defines the accommodation space $G_1$ of the electrode assembly 10.

For example, the revolving member 110 may be mounted on the case 34, and the vent housing 180 may be mounted on the case 34 so as to accommodate the revolving member 110, and the accommodation space $G_1$ and the housing space $G_2$ may be connected to each other via the first vent hole OP1 formed in the case 34.

As described above, according to the one or more of the above embodiments of the present invention, a gas accumulated in a secondary battery may be easily discharged to the outside without destruction of the secondary battery, and an internal gas may be discharged by sensitively reacting to a fine pressure increase inside the secondary battery. Also, the accumulated pressure inside the secondary battery may be resolved, and at the same time, an inflow of external harmful materials may be effectively prevented.

It should be understood that the exemplary embodiments described therein should be considered in a descriptive sense only and not for purposes of limitation. Descriptions of features or aspects within each embodiment should typically be considered as available for other similar features or aspects in other embodiments.

What is claimed is:

1. A secondary battery, comprising:
    a battery unit that has an accommodation space for an electrode assembly;
    a vent housing that defines a housing space connected with the accommodation space through a first vent hole, the vent housing comprising a second vent hole through which the housing space is connected with an outside of the secondary battery;
    a revolving member that is rotatably mounted between a closing position for closing both of the first and second vent holes and an opening position for opening both of the first and second vent holes; and
    first and second sealing caps that are formed at opposite sides of the revolving member with respect to a rotation axis of the revolving member,
    the first and second sealing caps respectively closing the first and second vent holes when the revolving member is mounted at the closing position.

2. The secondary battery of claim 1, wherein the revolving member is disposed in the housing space.

3. The secondary battery of claim 1, wherein the revolving member rotates in a first rotational direction to reach the closing position where the first and second vent holes are both closed, and rotates in a second and opposite rotational direction to reach the opening position where the first and second vent holes are both opened.

4. The secondary battery of claim 1, wherein the revolving member comprises first and second arms that extend in opposite directions with respect to the rotation axis, wherein the first and second sealing caps are formed at end portions of the first and second arms, respectively.

5. The secondary battery of claim 4, wherein a weight of the first arm biases the revolving member to the closing position, and a weight of the second arm biases the revolving member to the opening position, wherein the weight of the first arm is larger than the weight of the second arm.

6. The secondary battery of claim 5, wherein the first arm and the second arm are formed of different materials.

7. The secondary battery of claim 4, wherein the first arm extends longer than the second arm.

8. The secondary battery of claim 1, further comprising an elastic body that biases the revolving member to the closing position.

9. The secondary battery of claim 8, wherein the elastic body is a rotational spring having a first end and a second end connected to the revolving member and the rotation axis, respectively.

10. The secondary battery of claim 1, further comprising first and second filter members formed at open ends of the first and second vent holes, respectively.

11. The secondary battery of claim 10, wherein the first and second filter members have selective transmittivity to allow transmission of a gas and to prevent transmission of a fluid.

12. The secondary battery of claim 1, wherein a diameter of the first vent hole is larger than a diameter of the second vent hole.

13. The secondary battery of claim 1, wherein the first and second sealing caps protrude from the revolving member toward the first and second vent holes, respectively.

14. The secondary battery of claim 13, wherein a cross-section of each one of the first and second sealing caps gradually decreases in size toward the corresponding one of the first and second vent holes as the first and second sealing caps respectively protrude into the first and second vent holes.

15. The secondary battery of claim 14, wherein the first and second sealing caps are formed to have a cone shape having sharp front tips toward the first and second vent holes, respectively.

16. The secondary battery of claim 1, wherein surfaces of the first and second sealing caps contacting wall portions of the first and second vent holes are formed with elastic layers.

17. The secondary battery of claim 1, wherein the vent housing is disposed on a cap plate that defines the accommodation space.

18. The secondary battery of claim 17, wherein the first vent hole is formed in the cap plate.

19. The secondary battery of claim 18, further comprising a pair of electrode terminals that have opposite polarities and are respectively electrically connected to a positive electrode plate and a negative electrode plate of the electrode assembly, the electrode terminals being protruding from the cap plate.

* * * * *